Oct. 30, 1951     C. H. JAMES     2,573,025
SOLE EDGE BEVELING MACHINE

Filed Nov. 2, 1948     2 SHEETS—SHEET 1

Inventor
Cyril H. James
By his Attorney

Oct. 30, 1951  C. H. JAMES  2,573,025
SOLE EDGE BEVELING MACHINE
Filed Nov. 2, 1948  2 SHEETS—SHEET 2

Inventor
Cyril H. James
By his Attorney

UNITED STATES PATENT OFFICE 2,573,025

SOLE EDGE BEVELING MACHINE

Cyril H. James, Leicester, England, assignor to United Shoe Machinery Corporation, Flemington, N. J., a corporation of New Jersey Application November 2, 1948, Serial No. 57,937
In Great Britain November 29, 1947

1 Claim. (Cl. 51—72)

This invention relates to edge beveling machines and it is herein disclosed as embodied in a machine suitable for beveling the edges of fiber reinforced insoles. The reinforcing material most frequently used in such insoles is a hard stiff fiber which offers considerable resistance to cutting or trimming. It has, accordingly, been found desirable to use an abrading tool rather than a toothed cutting or trimming tool for operations upon material of this character. For an example of an insole edge beveling machine wherein the beveling tool consists of an abrading wheel, reference may be had to United States Letters Patent No. 1,991,458, granted February 19, 1935, upon the application of Harry Hallam.

It is an object of the present invention to provide an improved edge beveling machine of the type under consideration wherein the work piece is fed automatically to the beveling tool while being held against the beveling tool with a pressure which can be varied.

In accordance with this object, a feature of the illustrated machine consists in the provision of a driven disk which operates not only to feed the work past the beveling tool but also to hold the work down against a supporting turntable, in combination with a carrier for the disk mounted for adjustment to enable the components of feed and cross feed exerted by the disk upon the work to be varied.

Referring now to the accompanying drawings.

Figure 1:
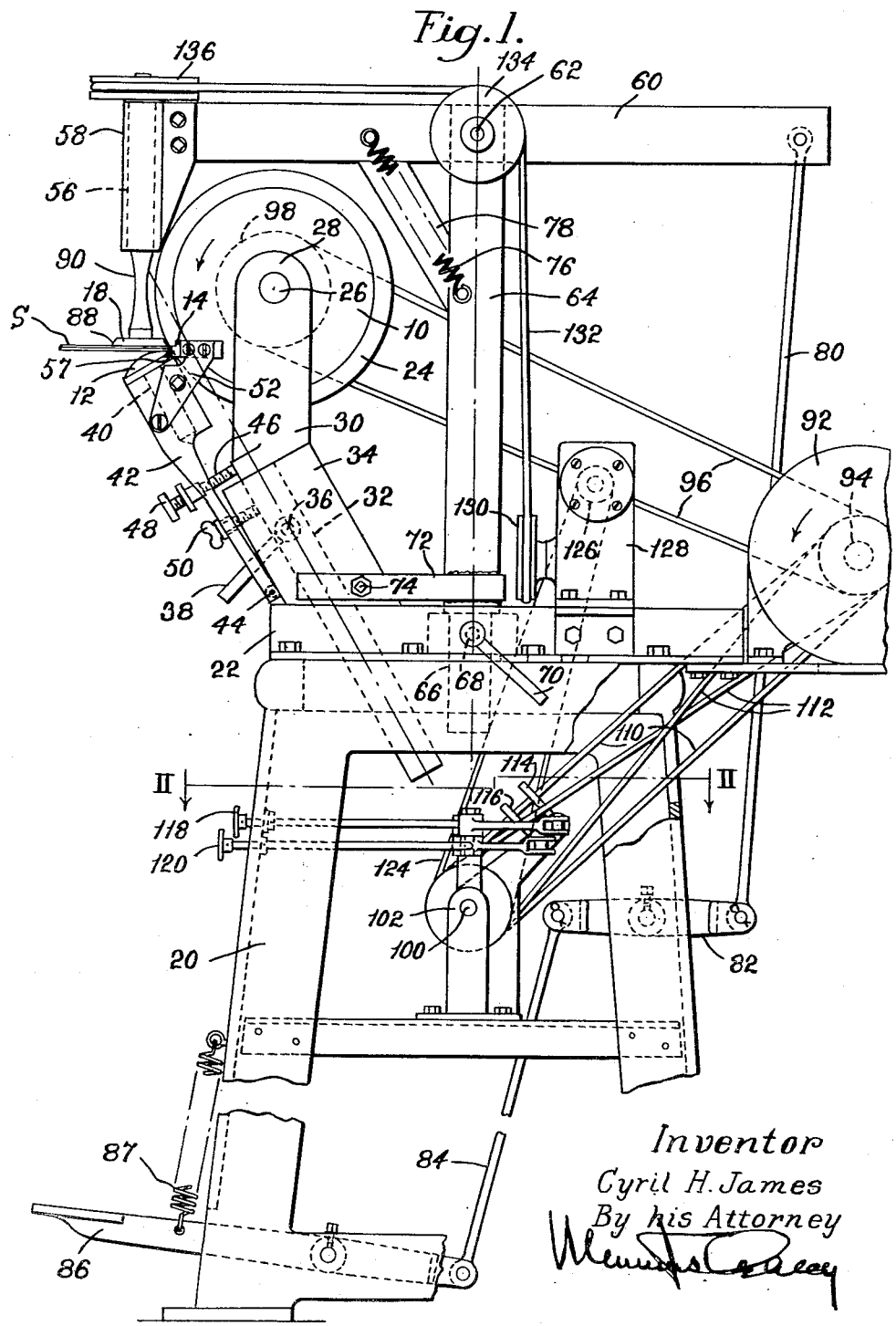
Fig. 1 is a side elevation of an illustrative machine embodying the invention.
Figure 3:
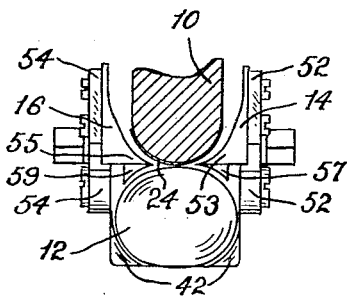
Fig. 3 is a detail plan view showing the relation of the work support and edge gages to the abrading wheel.

As shown in Figs. 1 and 3, the work-engaging instrumentalities consist of an abrading wheel 10, a work support 12, a pair of edge gages 14 and 16, and a feed disk 18. These members are shown in Fig. 1 in operative relation to the heel end of a work piece such as an insole S having its tread portion composed of a layer of hard fiber on which a bevel is to be formed. The insole S is presented to the machine in inverted position, with the fiber reinforcing layer uppermost.

The supporting structure of the machine comprises a frame 20 upon the upper portion of which is secured a base 22.

The abrading wheel 10 has a diameter of about 6" and a width or thickness of about 1". This wheel has a solid metal rim portion which presents, as seen in cross section (Fig. 3), a semi-circular outline. This convexly, transversely curved peripheral portion of the wheel is covered with a molded strip of abrasive sheet material 24. The abrading wheel 10 is carried by a shaft 26 which is journaled in bearings formed in a pair of upstanding ears 28 which embrace the wheel. The ears 28 are integral with a bracket 30 having an inclined base portion from which extends rearward and downward, at an angle of about 60° from the horizontal, a shaft or stem 32. Extending forward and upward at the same angle from the machine base 22 is a supporting bracket 34 having a bore which constitutes a bearing for the shaft 32. The under surface of the bracket 30 and the upper surface of the bracket 34 are provided with finished bearing surfaces to enable the bracket 30 to turn freely on the bracket 34. The bracket 30 can be clamped in any desired position of adjustment about the axis of the shaft 32 by a clamping screw 36 having a handle 38. The axis of the shaft 32 is tangent to a circle defined by the centers of curvature of the rounded periphery of the abrading wheel 10. This circle, in a wheel of the dimensions above specified, has a diameter of about 5". It is evident that the bracket 30 may be turned in either direction about the axis of its supporting shaft 32 without varying the center of curvature which, at any particular instant, coincides with the point of tangency.

The work support 12 is a turntable in the form of a mushroom-shaped idler roll of about 1½" diameter and having a smooth upper work supporting surface in the form of a segment of a sphere. Integral with and extending downward from the roll 12 is a short shaft or stem 40 which is journaled for free rotation in a bracket 42. The lower end of the bracket 42 is pivotally mounted for free swinging movement upon a pin 44 secured in the base 22 and extending horizontally and laterally of the machine (i. e., parallel to the shaft 26). Threaded through the intermediate portion of the bracket 42 is a stop screw 46 having a knurled head 48 at one end and having its opposite end arranged to engage a surface formed on the bracket 30. A thumb screw 50, passing through a suitable opening in the bracket 42 and threaded into the bracket 34, serves to clamp the bracket 42 in a position of adjustment determined by the stop screw 46. Removal of the thumb screw 50 permits the bracket 42 to be swung to an out-of-the-way position when access to the abrading wheel 10 is necessary for the purpose of replacing the abrasive cover 24.

The edge gage 14, which is positioned to the right of the periphery of the abrading wheel 10, is carried by a bracket 52; and the edge gage 16, which is positioned to the left of the peripheral portion of the abrading wheel 10, is carried by a bracket 54. The brackets 52 and 54 are secured to opposite sides of the bracket 42. The edge gages 14 and 16 are in the form of small blocks secured to the upper end portions of their respective brackets, the blocks having blade-like portions 53 and 55 which extend from the front sides of the blocks inward toward each other as shown in Fig. 5. The blade-like portions 53 and 55 have substantially vertical front surfaces which are engageable with the work piece and which extend in front of the outer portions of the abrasive cover 24 and above the work-engaging surface of the work-supporting roll 12. Extending forward from the blade-like portion 53 is an integral fin 57 having a smooth upper work-supporting surface like that of the work support 12. A similar fin 59 extends forward from the blade-like portion 55. Between the adjacent inner ends of the blade-like portions of the gages is a gap of about ¼" through which the work piece can engage the abrading roll. A narrow portion of the abrasive covering 24 adjacent to the gap between the blade-like portions 53 and 55 forms the operating portion of the abrading wheel 10.

The feed disk 18 is positioned immediately above the work support 12. It is frusto conical in shape with its lower or work-engaging face in a substantially horizontal plane. This work-engaging face of the feed disk is serrated to facilitate the feeding of a work piece. The diameter of the work-engaging surface of the feed disk 18 is approximately the same as that of the work support 12.

The feed disk 18 is mounted upon the lower end of a substantially vertical shaft 56 which is journaled in a block 58 secured upon the forward end of a lever 60. This lever 60 is fulcrumed upon a pin 62 carried by a vertical column 64 having a reduced lower end portion 66 which is journaled for rotation in a bearing carried by the base 22. The weight of the column 64 and the members supported thereby is carried by a thrust bearing comprising a shoulder formed at the junction of the reduced portion 66 and the upper portion of the column 64. A clamping screw 68 having a handle 70 is used to secure the column 64 in a desired position of angular adjustment about its axis. The shaft 56, the lever 60, and the column 64 thus constitute a carrier for the feed disk 18, which carrier is pivotally mounted for swinging movement of adjustment about the axis of the column to determine the position of the feed disk laterally of the machine, and thereby to determine the relative amount of cross feed imparted to the work. Rigidly secured to the lower portion of the column 64 and extending forward therefrom are a pair of parallel arms 72 (one of which appears in Fig. 1) embracing the bracket 34. A pair of coaxial screws 74 threaded through the respective arms 72 engage suitable surfaces formed on the bracket 34 to facilitate a fine angular adjustment of the column about its axis.

A tension spring 76 stretched diagonally between the forward portion of the lever 60 and the intermediate portion of the column 64 tends to hold the feed disk 18 down in a limiting position determined by a stop 78 secured on the column 64 and engageable by the lever 60. The spring 76 yields to permit upward movement of the feed disk 18 when a sole S is introduced between the feed disk and the work support 12. The lever 60 extends rearward as well as forward from its fulcrum pin 62 and at its rear end is pivotally connected to the upper end of a rod 80. The lower end of the rod 80 is connected through a lever 82 to a treadle rod 84, the latter being connected to a treadle 86. Depression of the treadle 86 serves to raise the feed disk 18 to facilitate the insertion and removal of a work piece. A treadle spring 87, supplemental to the spring 76, may be provided if desired.

Referring to Fig. 1, it will be observed that the feed disk 18 has a periphery 88 which is frusto conical and that the shaft 56 has a portion 90 which is reduced in diameter. The purpose of this construction is to provide clearance for the abrading wheel 10. When the treadle 86 is depressed the feed disk 18 will move in a path which is inclined forward as well as upward without coming into contact with the abrading wheel 10 and when the feed disk is lowered into its operating position, its operative lower surface will come close to the locality of contact of the sole S with the abrading wheel. The gripping action of the feed disk 18 maintains the work piece in an approximately horizontal plane tangent to the spherical surface of the work support 12 at a point adjacent to the periphery of the abrading wheel 10. The angle included between the adjacent portions of the periphery of the abrading wheel 10 and the work engaging surface of the feed disk 18 is about 64°. The result of the operation, therefore, will be to form a bevel of about 26° from the vertical on the work piece, that is, to form an angle of about 116° at the upper corner of the edge portion of the work piece.

Figure 2:
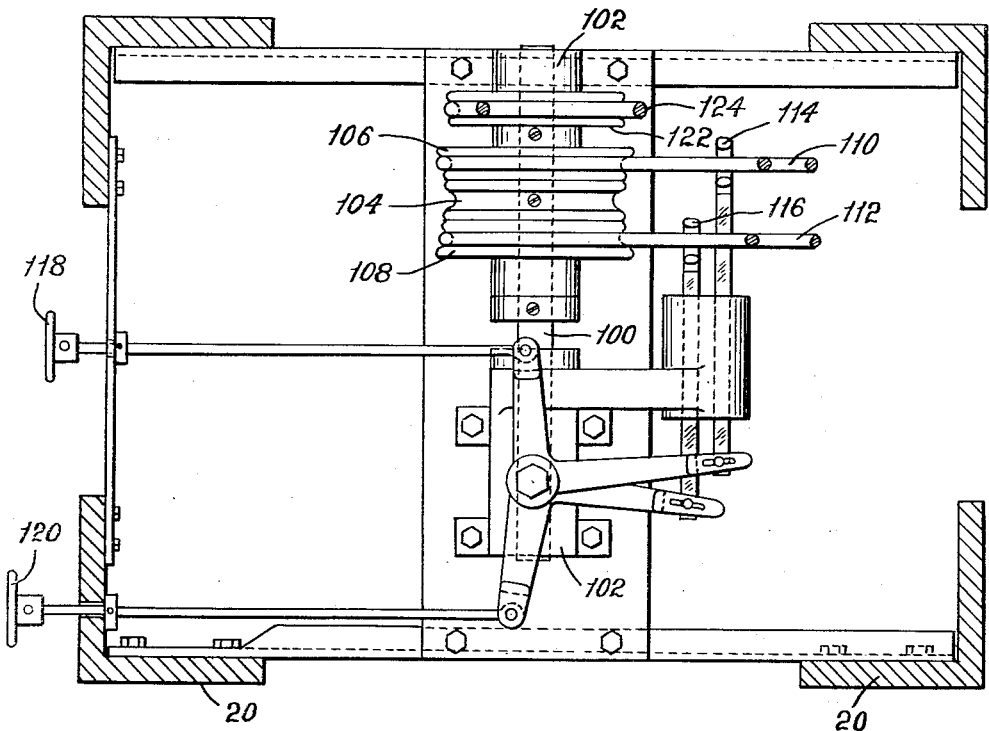
Fig. 2 is a plan sectional view taken on the line II—II of Fig. 1.

The machine is driven by a motor 92 (Fig. 1) having a shaft 94. A belt 96 running over a pulley 98 on the abrading roll shaft 26 and over a pulley on the motor shaft 94 drives the abrading roll 10 in the direction indicated by the arrow on Fig. 1. In order to enable the feed disk 18 to be driven in either direction, there is provided a countershaft 100 (see also Fig. 2) journaled in bearings 102 supported by the frame 20. Fixed upon the countershaft 100 is a pulley 104 and loose upon the countershaft 100 at opposite sides of the pulley 104 are pulleys 106 and 108. Running over the loose pulley 106 and also a pulley fixed upon the motor shaft 94 is an uncrossed belt 110 and running over the loose pulley 108 and a pulley fixed upon the motor shaft 94 is a crossed belt 112. Belt shifting devices 114 and 116 operated by handles 118 and 120 respectively enable either of the belts 110 or 112 to be shifted from its loose pulley to the fixed pulley 104 to drive the countershaft 100 in a desired direction. Also fixed upon the countershaft 100 is a pulley 122 which, through a belt 124, drives a pulley 126 fixed on a shaft extending from a train of reducing gears within a housing 128. These reducing gears drive a pulley 130 about which is looped a belt 132 passing up over a pair of idler pulleys freely rotatable upon the pin 62. One of these pulleys, indicated by the numeral 134, appears in Fig. 1. From these idler pulleys the belt 132 extends forward and passes about a pulley 136 fixed upon the shaft 56 of the feed disk 18. It is evident that the above described driving connections enable the operator, by manipulating the handles 118 and 120, to cause the feed disk 18 to be driven in either direction at will.

The operation of the machine as so far described will now be explained. The work-engaging instrumentalities are so arranged that a work piece such as the insole S is gripped against the rearward portion of the work-engaging surface of the work support 12 by the feed disk 18. The feed disk 18 tends to rotate the sole S in its own direction of rotation, causing the edge of the sole to bear against the vertical work-engaging surface of the blade-like portion 53 or the vertical work-engaging surface of the blade-like portion 55 in accordance with the direction of rotation. If, for example, the feed disk rotates in a counterclockwise direction, as seen from above, the sole will be moved into engagement with the operative surface of the right-hand edge gage 14. After the sole has engaged one or the other of the gages, the feed disk 18 will, as it continues to rotate, exert a force on the sole having one component tending to move the work piece toward the edge gage and the abrading wheel 10 and another component tending to move the work piece past the edge gage and the abrading wheel 10. The first-mentioned component serves to maintain the work piece pressed against both the wheel and the edge gage while the other component feeds the work. The feed disk 18 thus acts automatically to feed the sole past the abrading wheel 10 and to maintain it in operative engagement therewith without requiring the assistance of the operator. The edge gages 14 and 16 limit the movement of the sole toward the abrading wheel 10 to an extent sufficient for the required depth of bevel while at the same time preventing the abrading wheel from biting unduly into the edge portion of the sole. Since the gap between the edge gages 14 and 16 is small, the sole is adequately controlled even when sharply curved portions thereof (e. g., the heel seat portion of an insole) are being operated upon. This insures that the bevel formed on the edge part of the work will be substantially constant irrespective of whether a nearly straight edge or a sharply curved edge of the work is being operated upon.

During the operation of the machine, the abrasive material on the strip 24 wears chiefly on that side of the strip which is first engaged by the sole as the sole is fed. Therefore, in order to conserve abrasive material, the above-described provision has been made for reversal of the direction of rotation of the feed disk 18. Furthermore, if portions of the abrasive material adjacent to the outer edges of the strip 24 do not become worn these portions may be brought into operative position by a slight rotation of the bracket 30 to swing the wheel slightly about its center of transverse peripheral curvature and thereby to bring one or the other of the edge portions of its periphery into register with the gap between the edge gages.

The heightwise extent of the bevel on the edge portion of the work piece (and, therefore, the depth of the edge portion which remains unbeveled) may be adjusted by slackening the thumb screw 50 and adjusting the angle of inclination of the bracket 42 slightly, as above described, so as to position the edge gage further forward or rearward in the machine with respect to the position of the operative surface of the abrading wheel 10.

The ratio between the components of force exerted on the sole S by the feed disk 18 (i. e., the feeding component and the cross feeding component) may be varied by rotary adjustment of the column 64 about its axis to determine the position of the axis of the feed disk 18 toward one side or the other of the machine (i. e., relatively to the axis of the work support 12) in the manner already described.

In using the machine to bevel the edge portion of the heel seat of an insole the operator depresses the treadle 86 to raise the feed disk 18 and places that portion of the insole at which he desires to begin the beveling operation on the rearward portion of the work-engaging surface of the work support 12, with the edge of the sole in contact with the appropriate gage 14 or 16 according to the direction in which the work is to be fed. He then releases the treadle and permits the feed disk 18 to grip the work piece against the work support 12. The feed disk 18 then operates, in the manner above described, to feed the sole without further assistance from the operator. The sole is held in an approximately horizontal plane by the gripping action of the feed disk which holds the sole against the rearward portion of the work-engaging surface of the work support 12 and, because of the angular relationship between the sole thus held and the abrading wheel 10, the abrading wheel operates to form a bevel at the upper corner of the sole at an angle of about 116°. The pressure with which the sole is held against the abrading wheel is substantially constant irrespective of the curvature of the portion of the sole operated upon and the speed at which the work is fed is substantially constant and, therefore, the abrading action results in a uniform bevel. Upon completion of the operation the operator depresses the treadle and removes the sole from the machine.

Having described my invention, what I claim as new and desire to secure by Letters Patent of the United States is:

In a sole edge beveling machine, a beveling tool, a work support in the form of a turntable, a feed disk having a substantially plane work-engaging surface for holding a sole down on the work support and for exerting upon the sole a force having components of feed and of cross feed, and a carrier for said feed disk pivotally mounted for a swinging movement of adjustment relative to the work support and about an axis parallel to that of the feed disk to enable the ratio between the components of feed and cross feed to be varied.

CYRIL HARRY JAMES.

REFERENCES CITED

The following references are of record in the file of this patent:

UNITED STATES PATENTS

| Number | Name | Date |
|---|---|---|
| 359,439 | Gilroy | Mar. 15, 1887 |
| 1,652,494 | Parker | Dec. 13, 1927 |
| 1,688,068 | Beyer | Oct. 16, 1928 |
| 1,726,571 | Kelly | Sept. 3, 1929 |
| 1,954,970 | Wilson | Apr. 17, 1934 |
| 1,958,734 | Woodsmall | May 15, 1934 |
| 2,206,842 | Indge | July 2, 1940 |
| 2,242,377 | Van Zomeren | May 20, 1941 |
| 2,347,087 | Deyarmond | Apr. 18, 1944 |
| 2,419,858 | Taber | Apr. 29, 1947 |